(12) United States Patent
Zhang et al.

(10) Patent No.: US 11,562,150 B2
(45) Date of Patent: Jan. 24, 2023

(54) LANGUAGE GENERATION METHOD AND APPARATUS, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Han Zhang, Beijing (CN); Dongling Xiao, Beijing (CN); Yukun Li, Beijing (CN); Yu Sun, Beijing (CN); Hao Tian, Beijing (CN); Hua Wu, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 378 days.

(21) Appl. No.: 17/031,569

(22) Filed: Sep. 24, 2020

(65) Prior Publication Data
US 2021/0232775 A1  Jul. 29, 2021

(30) Foreign Application Priority Data
Jan. 23, 2020 (CN) .......................... 202010076479.2

(51) Int. Cl.
G06F 17/00 (2019.01)
G06F 40/56 (2020.01)
(52) U.S. Cl.
CPC .................................... G06F 40/56 (2020.01)
(58) Field of Classification Search
CPC ..................................................... G06F 40/56
(Continued)

(56) References Cited

U.S. PATENT DOCUMENTS 10,380,236 B1   8/2019 Ganu et al.
11,182,566 B2 * 11/2021 Jaitly ...................... G10L 15/16
(Continued)

FOREIGN PATENT DOCUMENTS

CN   107705784 A   2/2018
CN   110209801 A   9/2019
(Continued)

OTHER PUBLICATIONS

Xie, Z.,"Neural Text Generation: A Practical Guide," Nov. 27, 2017, arXiv, 20 pages.*
Bahuleyan, H.,"Natural Language Generation with Neural Variational Models," Aug. 27, 2018, arXiv, 99 pages.*
(Continued)

*Primary Examiner* — Cesar B Paula
*Assistant Examiner* — James H. Blackwell
(74) *Attorney, Agent, or Firm* — Fay Sharpe LLP

(57) ABSTRACT

The present disclosure proposes a language generation method and apparatus. The method includes: performing encoding processing on an input sequence by using a preset encoder to generate a hidden state vector corresponding to the input sequence; in response to a granularity category of a second target segment being a phrase, decoding a first target segment vector, the hidden state vector, and a position vector corresponding to the second target segment by using N decoders to generate N second target segments; determining a loss value based on differences between respective N second target segments and a second target annotated segment; and performing parameter updating on the preset encoder, a preset classifier, and the N decoders based on the loss value to generate an updated language generation model for performing language generation.

18 Claims, 4 Drawing Sheets

(58) Field of Classification Search
USPC .......................................................... 704/9
See application file for complete search history.

(56) References Cited

U.S. PATENT DOCUMENTS

| | | | | |
|---|---|---|---|---|
| 2011/0093414 | A1* | 4/2011 | Xu | G06F 40/237 |
| | | | | 706/12 |
| 2016/0170972 | A1 | 6/2016 | Andrejko et al. | |
| 2021/0004541 | A1* | 1/2021 | Saito | G06F 40/30 |
| 2021/0192136 | A1* | 6/2021 | Sar Shalom | G06F 16/3329 |

FOREIGN PATENT DOCUMENTS

| | | |
|---|---|---|
| CN | 110209817 A | 9/2019 |
| CN | 110619034 A | 12/2019 |
| CN | 110717431 A | 1/2020 |
| CN | 109858032 A | 6/2020 |
| JP | 2018132969 A | 8/2018 |
| JP | 2019537096 A | 12/2019 |
| WO | 2012120888 A1 | 9/2012 |

OTHER PUBLICATIONS

Sun, Y. et al.,"ERNIE: Enhanced Representation Through Knowledge Integration," Apr. 19, 2019, arXiv, 8 pages.*
Extended European Search Report for Application No. 20216667.4, dated Jun. 16, 2021, 7 pages.
Office Action for Japanese Application No. 2020-215548, dated Mar. 1, 2022, 3 pages.
The Wayback Machine—https://web.archive.org/web/20190812220104/https://jalammar.github.lo/illustrated-g . . . , The Illustrated GPT-2 (Visulaizing Transformer Language Models), dated Aug. 12, 2019, 29 pages.
Office Action for Chinese Application No. 202010076479.2, dated Jul. 31, 2020, 14 pages.
Zheng-Wen et al., "Question Based Importance Weighting Network for Answer Selection", Journal of Sichuan University, Jan. 2020, vol. 57, No. 1, 7 pages (with English Abstract).
Devlin et al., "BERT: Pre-training of Deep Bidirectional Transformers for Language Understanding", printed from the internet, 16 pages.
Chen et al., "Execution-Guided Neural Program Synthesis", Published as a conference paper at ICLR 2019, 15 pages.

* cited by examiner

LANGUAGE GENERATION METHOD AND APPARATUS, ELECTRONIC DEVICE AND STORAGE MEDIUM

CROSS-REFERENCE TO RELATED APPLICATION

The present application is based upon and claims priority to Chinese Patent Application No. 202010076479.2, filed on Jan. 23, 2020, the entirety contents of which are incorporated herein by reference.

FIELD

The present disclosure relates to a field of computer technologies, more particularly, to a field of natural language processing technologies, and provides a language generation method and apparatus, an electronic device and a non-transitory computer-readable storage medium.

BACKGROUND

In natural language generation technologies, a deep neural network may be used to perform self-supervised learning on a great amount of unsupervised data to generate a pre-trained model. In a specific language generation task, fine-tuning may be performed on parameters of the pre-trained model based on supervised training data of the task. And then, transfer learning may be performed on the pre-trained model to generate a language generation model for the task.

SUMMARY

The present disclosure provides a language generation method and apparatus, an electronic device and a non-transitory computer-readable storage medium.

Embodiments of an aspect of the present disclosure provide a language generation method, including: performing encoding processing on an input sequence by using a preset encoder to generate a hidden state vector corresponding to the input sequence; classifying the hidden state vector and a generated first target segment vector by using a preset classifier to determine a granularity category of a second target segment to be predicted; in response to the second target segment being a phrase, decoding the first target segment vector, the hidden state vector and a position vector corresponding to the second target segment by using N decoders to generate N second target segments, in which N is an integer greater than 1; determining a loss value based on differences between respective N second target segments and a second target annotated segment; and performing parameter updating on the preset encoder, the preset classifier, and the N decoders based on the loss value to generate an updated language generation model for performing language generation.

Embodiments of another aspect of the present disclosure provide a language generation apparatus, including: a non-transitory computer-readable medium including computer-executable instructions stored thereon, and an instruction execution system which is configured by the instructions to implement at least one of: a first generation module, configured to perform encoding processing on an input sequence by using a preset encoder to generate a hidden state vector corresponding to the input sequence; a first determination module, configured to classify the hidden state vector and a generated first target segment vector by using a preset classifier to determine a granularity category of a second target segment to be predicted; a second generation module, configured to, in response to the second target segment being a phrase, decode the first target segment vector, the hidden state vector and a position vector corresponding to the second target segment by using N decoders to generate N second target segments, in which N is an integer greater than 1; a second determination module, configured to determine a loss value based on differences between respective N second target segments and a second target annotated segment; and a language generation module, configured to perform parameter updating on the preset encoder, the preset classifier, and the N decoders based on the loss value to generate an updated language generation model for performing language generation.

Embodiments of yet another aspect of the present disclosure provide an electronic device. The electronic device includes at least one processor and a storage device communicatively connected to the at least one processor. The storage device stores an instruction executable by the at least one processor. When the instruction is executed by the at least one processor, the at least one processor may implement the language generation method as described above.

Embodiments of still yet another aspect of the present disclosure provide a non-transitory computer-readable storage medium having a computer instruction stored thereon. The computer instruction is configured to make a computer implement a language generation method. The method includes: performing encoding processing on an input sequence by using a preset encoder to generate a hidden state vector corresponding to the input sequence; classifying the hidden state vector and a generated first target segment vector by using a preset classifier to determine a granularity category of a second target segment to be predicted; in response to the second target segment being a phrase, decoding the first target segment vector, the hidden state vector and a position vector corresponding to the second target segment by using N decoders to generate N second target segments, N being an integer greater than 1; determining a loss value based on differences between respective N second target segments and a second target annotated segment; and performing parameter updating on the preset encoder, the preset classifier, and the N decoders based on the loss value to generate an updated language generation model for performing language generation.

Other effects of the above-mentioned optional implementations will be described below in combination with specific embodiments.

BRIEF DESCRIPTION OF THE DRAWINGS

The accompanying drawings are used for a better understanding of the solution and do not constitute a limitation to the present disclosure.

DETAILED DESCRIPTION

Figure 1:
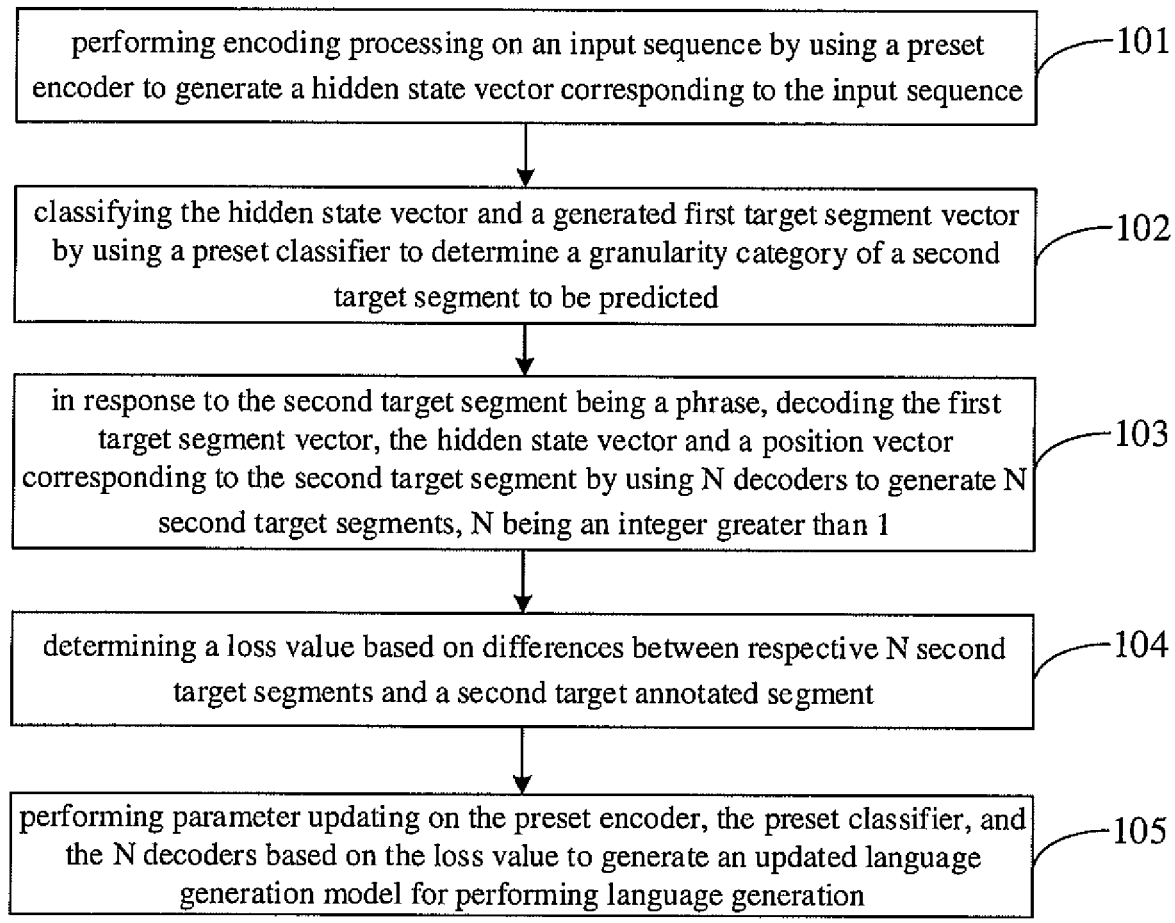
FIG. 1 is a flowchart of a language generation method according to an embodiment of the present disclosure.

Exemplary embodiments of the present disclosure are described below with reference to the accompanying drawings, which include various details of the embodiments of the present disclosure to facilitate understanding, and should be considered as merely exemplary. Therefore, those skilled in the art should recognize that various changes and modifications may be made to the embodiments described herein without departing from the scope and spirit of the present disclosure. Also, for clarity and conciseness, descriptions of well-known functions and structures are omitted in the following description.

In the related art, the language generation technology based on language generation pre-training/fine-tuning framework relies on semantic representation modeling, while semantic representation models such as a bidirectional encoder representation from transformers (BERT) model usually take a single character as a decoding unit. Since semantic information contained in a single character is not rich enough, semantic representation models cannot learn an overall semantic meaning of a whole text, such that a language generation model has a problem of low accuracy. With respect to the problem, embodiments of the present disclosure provide a language generation method.

A language generation method and apparatus, an electronic device, and a storage medium provided by the present disclosure will be described in detail below with reference to the drawings.

Any of the embodiments in the present disclosure has following advantages or beneficial effects. In the pre-training process of the language generation model, language segments at different granularities are flexibly established based on original basic character units of the input sequence, and a plurality of encoders are used to predict the target segment at a granularity of phrase, thereby improving the learning effect on an overall semantic meaning of the input sequence, and increasing the accuracy of the language generation model. The encoding processing is performed on the input sequence by using the preset encoder to generate the hidden state vector corresponding to the input sequence. The hidden state vector and the generated first target segment vector are classified by using the preset classifier to determine a granularity category of the second target segment to be predicted. In response to the second target segment being a phrase, the first target segment vector, the hidden state vector and the position vector corresponding to the second target segment are decoded by using the N decoders to generate the N second target segments. N is an integer greater than 1. The loss value is determined based on the differences between respective N second target segments and the second target annotated segment. The parameter updating is performed on the preset encoder, the preset classifier, and the N decoders based on the loss value to generate the updated language generation model for performing language generation. Since the semantic representation models cannot learn the overall semantic meaning of the whole text as they usually take a single character as a decoding unit, the language generation model has the problem of low accuracy. The above technical solution overcomes the problem of low accuracy.

The language generation method according to embodiments of the present disclosure will be described in detail below with reference to FIG. 1.

FIG. 1 is a flowchart of a language generation method according to an embodiment of the present disclosure.

As illustrated in FIG. 1, the language generation method includes the followings.

At block 101, encoding processing is performed on an input sequence by using a preset encoder to generate a hidden state vector corresponding to the input sequence.

It should be noted that the language generation method according to embodiments of the present disclosure may be executed by a language generation apparatus according to embodiments of the present disclosure. The language generating apparatus according to embodiments of the present disclosure may be configured in any electronic device, such as a mobile phone, a computer, a personal digital assistant, a human-computer interaction voice device, a smart robot, and a wearable device, which is not limited in embodiments of the present disclosure.

The input sequence refers to a training sample used for training the language generation model. For example, the input sentence may be text information.

The hidden state vector corresponding to the input sequence refers to a vector representation of the input sequence.

In embodiments of the present disclosure, the preset encoder may be any model capable of vector representation of natural speech, which is not limited in embodiments of the present disclosure. In the process of training the language generation model, a set of training samples may be constructed in advance. Each training sample in the set of training samples may be determined as an input sequence and inputted into the preset encoder separately to perform the encoding processing on the input sequence by using the preset encoder so as to generate the hidden state vector corresponding to the input sequence.

At block 102, the hidden state vector and a generated first target segment vector are classified by using a preset classifier to determine a granularity category of a second target segment to be predicted.

The preset classifier refers to a pre-trained classification model that may determine a granularity category of a segment to be predicted in the input sequence.

The first target segment refers to a segment that has been predicted in the input sequence, based on the hidden state vector of the input sequence, by the decoder according to embodiments of the present disclosure.

It can be understood that, the present disclosure provides a solution for generating phrases. A phrase is generated segment by segment. The segment may be a character, a word, or a phrase, that is, the phrase may be generated from multiple granularities. The generated first target segment refers to a segment that has been generated before the current segment is generated. For example, during the generation of a sentence "I am Chinese", if the current segment to be generated is the third character "Chinese", the generated first target segments may be characters "I" and "am".

The second target segment refers to a segment that currently needs to be predicted in the input sequence.

Granularity categories of the second target segment may include categories such as characters and phrases. It should be noted that second target segments of different granularity categories may be predicted with different decoders.

In embodiments of the present disclosure, the preset classifier may classify the hidden state vector corresponding to the input sequence and the generated first target segment vector to determine and output a granularity category of the second target segment to be predicted. For example, when an output of the preset classifier is "0", it means that the granularity category of the second target segment to be predicted is character; and when the output of the preset classifier is "1", it means that the granularity category of the second target segment to be predicted is phrase. It should be noted that for the first prediction of the input sequence, that is, when the second target segment is the first segment in the input sequence, the generated first target segment vector may be empty, that is, the preset classifier may determine the granularity category of the second target segment to be predicted based on the hidden state vector corresponding to the input sequence.

Further, when it is determined that the granularity category of the second target segment is a character, a decoder corresponding to the character may be used to predict the second target segment. That is, in a possible implementation of embodiments of the present disclosure, after the act in block 102, the method may further include the followings.

If the second target segment is a character, a decoder corresponding to the character may be used to decode the first target segment vector, the hidden state vector, and a position vector of the first target segment to generate the second target segment.

The position vector of the first target segment refers to a vector representation of a position feature of the first target segment in the input sequence.

Figure 2:
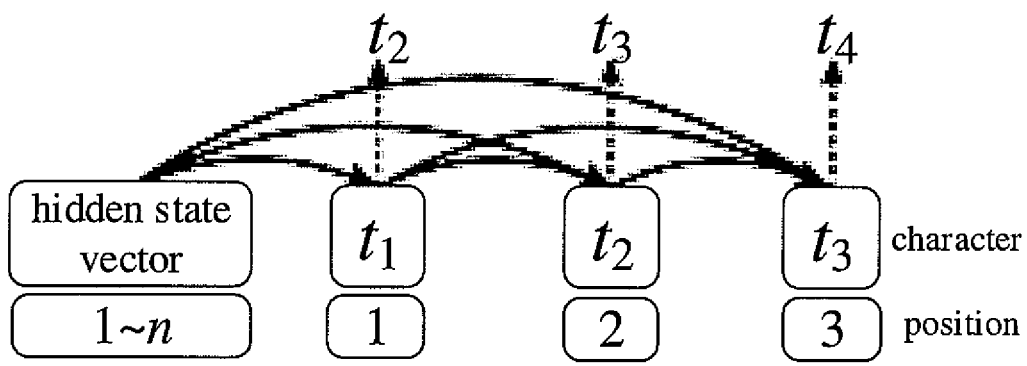
FIG. 2 is a schematic diagram of predicting a target segment by using a decoder corresponding to a character.

For example, as illustrated in FIG. 2, which is a schematic diagram of predicting a target segment by using a decoder corresponding to a character, n represents the number of characters included in the input sequence. If the second target segment is $t_2$, the first target segment is $t_1$, and the position vector of the first target segment refers to the vector representation of the position feature of $t_1$ in the input sequence. If the second target segment is $t_3$, the first target segments include $t_1$ and $t_2$, and position vectors of the first target segments refer to vector representations of position features of $t_1$ and $t_2$ in the input sequence.

In embodiments of the present disclosure, the decoder corresponding to the character may be pre-trained, so that when it is determined that the second target segment is a character, the decoder corresponding to the character may be used to decode the first target segment vector, the hidden state vector, that is, the position vector of the first target segment, to generate the second target segment. It should be noted that when the second target segment is a character, the generation of the second target segment depends on the hidden state vector of the input sequence, all the first target segment vectors generated before the second target segment, and the position vector of the first target segment.

For example, as illustrated in FIG. 2, when the second target segment is $t_1$, the decoder corresponding to the character may decode the hidden state vector to generate the second target segment $t_1$. When the second target segment is $t_2$, the decoder corresponding to the character may decode the hidden state vector, the vector of the first target segment $t_1$, and the position vector of the first target segment $t_1$ to generate the second target segment $t_2$. When the second target segment is $t_3$, the decoder corresponding to the character may decode the hidden state vector, vectors of the first target segments $t_1$ and $t_2$, and the position vectors of the first target segments $t_1$ and $t_2$ to generate the second target segment $t_3$. By analogy, each segment at a granularity of character in the input sequence may be predicted.

At block 103, in response to the second target segment being a phrase, the first target segment vector, the hidden state vector and a position vector corresponding to the second target segment may be decoded by using N decoders to generate N second target segments. N is an integer greater than 1.

It should be noted that when the second target segment is a phrase, similarly, respective characters included in the second target segment are predicted, and the target segment is generated based on respective characters predicted.

The position vector corresponding to the second target segment is related to a position of a currently predicted character in the second target segment. In detail, if the currently predicted character is the first character in the second target segment, the position vector corresponding to the second target segment is the position vector of the first target segment. If the currently predicted character is not the first character in the second target segment, the position vector corresponding to the second target segment includes the position vector of the first target segment and position vectors of respective characters in the second target segment before the currently predicted character.

In embodiments of the present disclosure, in order to improve the accuracy of phrase prediction, multiple decoders for predicting phrases may be trained in advance to predict phrases from different granularities. Therefore, when it is determined that the second target segment is a phrase, the N decoders may be used to decode the first target segment vector, the hidden state vector, and the position vector corresponding to the second target segment. Each decoder may generate one second target segment, such that the N second target segments may be generated.

As a possible implementation, two decoders may be used to respectively predict the second target segment at a granularity of phrase from two granularities. In the following, as an example, the second target segment includes two characters and the N decoders at least include a first decoder and a second decoder. That is, in a possible implementation of embodiments of the present disclosure, the act in block 103 may include the followings.

The first target segment vector, the hidden state vector, and a first position vector corresponding to the second target segment are decoded by using the first decoder to generate a first candidate character at a first position.

The first target segment vector, a vector corresponding to the first candidate character, the hidden state vector, and a second position vector corresponding to the second target segment are decoded by using the first decoder to generate a first candidate character at a second position.

A first second target segment is generated based on the first candidate character at the first position and the first candidate character at the second position.

The first target segment vector, the hidden state vector and the first position vector are decoded by using the second decoder to generate a second candidate character at the first position.

The first target segment vector, the hidden state vector and the second position vector are decoded by using the second decoder to generate a second candidate character at the second position.

A second second target segment is generated based on the second candidate character at the first position and the second candidate character at the second position.

The first position vector corresponding to the second target segment is a position vector of a first target segment, and the second position vector corresponding to the second target segment includes the position vector of the first target segment and a position vector of a first character in the second target segment.

The first position refers to a position of the first character in the second target segment in the second target segment, and the second position refers to a position of the second character in the second target segment in the second target segment.

In embodiments of the present disclosure, the first decoder may predict the second target segment at the granularity of phrase from a granularity of character. When the first decoder is used to predict the first character in the second target segment, the first decoder may decode the generated first target segment vector, the hidden state vector, and the position vector of the first target segment to generate the first candidate character at the second position in the second target segment, that is, the first character in the second target segment. That is to say, when the first character in the second target segment is predicted by using the first decoder, the prediction depends on the hidden state vector of the input sequence, all the first target segment vectors generated before the first character and the position vector of the first target segment.

Correspondingly, after the first character in the second target segment is predicted, the first decoder may be used to predict the second character in the second target segment, that is, the first decoder may be used to decode the generated first target segment vector, the vector corresponding to the first candidate character, the hidden state vector, the position vector of the first target segment, and the position vector of the first character in the second target segment to generate the first candidate character at the second position of the second target segment, that is, the second character in the second target segment. That is to say, predicting the second character in the second target segment by using the first decoder not only depends on the hidden state vector of the input sequence, all the first target segment vectors generated before the second character, and the position vector of the first target segment, but also depends on the vector and position vector corresponding to the first character in the second target segment.

After the first candidate character at the first position and the first candidate character at the second position are determined by using the first decoder, the first candidate character at the first position and the first candidate character at the second position may be used to form the first second target segment.

In embodiments of the present disclosure, the second decoder may predict the second target segment at the granularity of phrase from a granularity of phrase. When the second decoder is used to predict the first character in the second target segment, the second decoder may decode the generated first target segment vector, the hidden state vector, and the position vector of the first target segment to generate the second candidate character at the second position in the second target segment, that is, the first character in the second target segment. That is to say, when the first character in the second target segment is predicted by using the second decoder, the prediction depends on the hidden state vector of the input sequence, all the first target segment vectors generated before the first character and the position vector of the first target segment.

Correspondingly, after the first character in the second target segment is predicted, the second decoder may be used to predict the second character in the second target segment, that is, the second decoder may be used to decode the generated first target segment vector, the hidden state vector, the position vector of the first target segment, and the position vector of the first character in the second target segment to generate the second candidate character at the second position of the second target segment, that is, the second character in the second target segment. That is to say, predicting the second character in the second target segment by using the second decoder not only depends on the hidden state vector of the input sequence, all the first target segment vectors generated before the second character, and the position vector of the first target segment, but also depends on the position vector of the first character in the second target segment. However, the prediction does not depend on the vector of the first character, that is, the semantic meaning of the first character.

After the second candidate character at the first position and the second candidate character at the second position are determined by using the second decoder, the second candidate character at the first position and the second candidate character at the second position may be used to form the second second target segment.

Further, during the prediction of each character in the second target segment, the position feature of the character currently predicted may be introduced to further improve the accuracy of the prediction. That is, in a possible implementation of embodiments of the present disclosure, before the act in block 103, the method may further include: obtaining a preset placeholder vector.

Correspondingly, the act in block 103 may include decoding the preset placeholder vector, the first target segment vector, the hidden state vector, and the position vector corresponding to the second target segment by using the N decoders to generate the N second target segments.

It should be noted that during the prediction of each character in the second target segment, the position vector of the currently predicted character needs to be introduced to further improve the accuracy of predicting the second target segment. However, due to characteristics of the decoder, it is impossible to obtain the position vector of the character before predicting the character, so that a preset placeholder vector may be introduced after each character in the input sequence. Consequently, the position vector of the character currently predicted character may be determined based on the placeholder vector and the position vector of the generated first target segment. In the following, a specific description will be given by taking the second target segment including two characters and the N decoders including the first decoder and the second decoder as an example.

In embodiments of the present disclosure, the first decoder may predict the second target segment at the granularity of phrase from the granularity of character. When the first decoder is used to predict the first character in the second target segment, the first decoder may determine, based on the preset placeholder vector corresponding to the second target segment and the position vector corresponding to the second target segment (that is, the position vector of the first target segment), the first position vector (that is, the position vector of the first character in the second target segment) and the second position vector (that is, the position vector of the second character in the second target segment) corresponding to the second target segment. And then, the first decoder may decode the first target segment vector, the hidden state vector, and the position vector of the first character in the second target segment to generate the first candidate character at the first position. The first decoder may be used to decode the first target segment vector, the vector corresponding to the first candidate character, the hidden state vector, and the position vector of the second character in the second target segment to generate the first candidate character at the second position. The first second target candidate segment may be generated based on the first candidate character at the first position and the first candidate character at the second position.

Correspondingly, the second decoder may predict the second target segment at the granularity of phrase from the granularity of phrase. When predicting the first character in the second target segment, the second decoder may first determine, based on the preset placeholder vector corresponding to the second target segment and the position vector corresponding to the second target segment (that is, the position vector of the first target segment), the first position vector (that is, the position vector of the first character in the second target segment) and the second position vector (that is, the position vector of the second character in the second target segment) corresponding to the second target segment. And then, the second decoder may decode the first target segment vector, the hidden state vector, and the position vector of the first character in the second target segment to generate the second candidate character at the first position. The second decoder may be used to decode the first target segment vector, the hidden state vector, and the position vector of the second character in the second target segment to generate the second candidate character at the second position. The second target candidate segment may be generated based on the second candidate character at the first position and the second candidate character at the second position.

Figure 3:
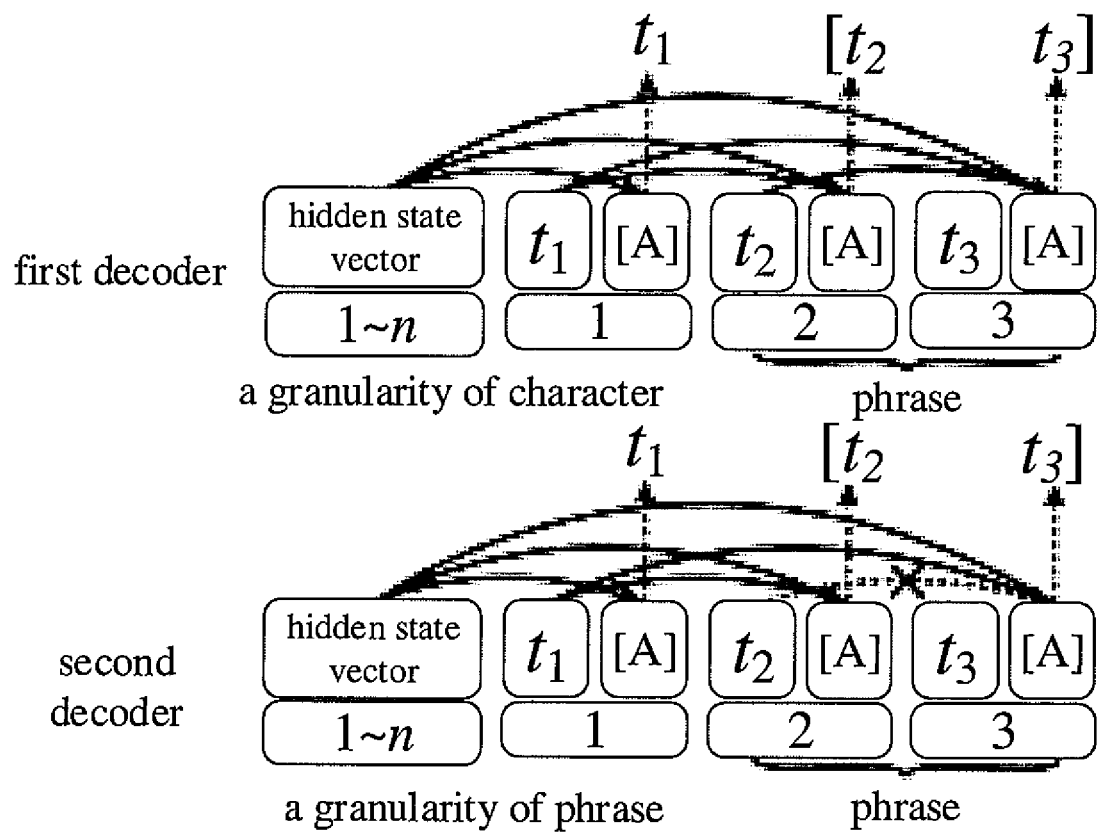
FIG. 3 is a schematic diagram of predicting a target segment by introducing a placeholder vector according to embodiments of the present disclosure.

For example, as illustrated in FIG. 3, [A] represents a preset placeholder vector. If the second target segment is a phrase composed of $t_2$ and $t_3$, when predicting $t_2$, the first decoder may determine the position vector of $t_2$ and the position vector of $t_3$ based on the preset placeholder vector corresponding to the second target segment and the position vector of $t_1$. And then, the first encoder may decode the vector of the first target segment $t_1$, the hidden state vector and the position vector of $t_2$ to generate the first candidate character at position $t_2$. The first decoder may decode the first target segment vector, the vector of the first candidate character $t_2$, the hidden state vector, and the position vector of $t_3$ to generate the first candidate character at position $t_3$. The first second target candidate segment may be generated based on the first candidate character at position $t_2$ and the first candidate character at position $t_3$.

Correspondingly, the second decoder may determine the position vector of $t_2$ and the position vector of $t_3$ based on the preset placeholder vector corresponding to the second target segment and the position vector of $t_1$. And then, the second decoder may decode the first target segment vector, the hidden state vector, and the position vector of $t_2$ to generate the second candidate character at position $t_2$. The second decoder may decode the first target segment vector, the hidden state vector, and the position vector of $t_3$ to generate the second candidate character at position $t_3$. The second second target candidate segment may be generated based on the second candidate character at position $t_2$ and the second candidate character at position $t_3$.

At block 104, a loss value is determined based on differences between respective N second target segments and a second target annotated segment.

The second target annotated segment may be an original language segment corresponding to a corresponding position of the second target segment in the input sequence, or may be annotation data corresponding to the corresponding position of the second target segment in the input sequence.

A difference between the second target segment and the second target annotated segment may be measured by using a vector distance between a second target segment vector and a second target annotated segment vector, which is not limited in embodiments of the present disclosure.

In detail, the longer the vector distance between the second target segment vector and the second target annotated segment vector, the greater the difference between the second target segment and the second target annotated segment, and thus the greater the loss value corresponding to the second target segment; and on the contrary, the shorter the vector distance between the second target segment vector and the second target annotated segment vector, the smaller the difference between the second target segment and the second target annotated segment, and thus the smaller the loss value corresponding to the second target segment.

In embodiments of the present disclosure, since the second target annotated segment may be used to indicate an optimal prediction result, the differences between respective second target segments predicted and the second target annotated segment may be used to measure the accuracy of model prediction, so that the differences between respective N second target segments and the second target annotated segment may be used to determine the loss value.

In some embodiments, a sum of differences between respective N second target segments and the second target annotated segment may be determined as the loss value.

At block 105, parameter updating is performed on the preset encoder, the preset classifier, and the N decoders based on the loss value to generate an updated language generation model for performing language generation.

In embodiments of the present disclosure, after the loss value is determined, back propagation may be performed on the loss value. The parameter updating may be performed on the preset encoder, the preset classifier, and the N decoders based on a gradient descent optimization algorithm, so as to improve the performance of the preset encoder, the preset classifier and the N decoders until the loss value obtained by predicting the input sequence based on the updated preset encoder, preset classifier and N decoders is less than a loss value threshold. And then, it may be determined that the updated model meets requirements of performance, so that the updated preset encoder, preset classifier and N decoders may be used to generate the language generation model for performing language generation.

With the technical solution according to embodiments of the present disclosure, the encoding processing is performed on the input sequence by using the preset encoder to generate the hidden state vector corresponding to the input sequence. The hidden state vector and the generated first target segment vector are classified by using the preset classifier to determine the granularity category of the second target segment to be predicted. In response to the second target segment being a phrase, the first target segment vector, the hidden state vector and the position vector corresponding to the second target segment are decoded by using the N decoders to generate the N second target segments. N is an integer greater than 1. The loss value is determined based on the differences between respective N second target segments and the second target annotated segment.

The parameter updating is performed on the preset encoder, the preset classifier, and the N decoders based on the loss value to generate the updated language generation model for performing language generation. Consequently, in the pre-training process of the language generation model, language segments at different granularities are flexibly established based on original basic character units of the input sequence, and multiple encoders are used to predict the target segment at the granularity of phrase, thereby improving the learning effect on an overall semantic meaning of the input sequence, and increasing the accuracy of the language generation model.

In a possible implementation of the present disclosure, the loss value may be generated by merging the differences between respective N second target segments and the second target annotated segment based on a preset weight, thereby further improving the reliability of the loss value.

The language generation method according to embodiments of the present disclosure will be further described below in combination with FIG. 4.

Figure 4:
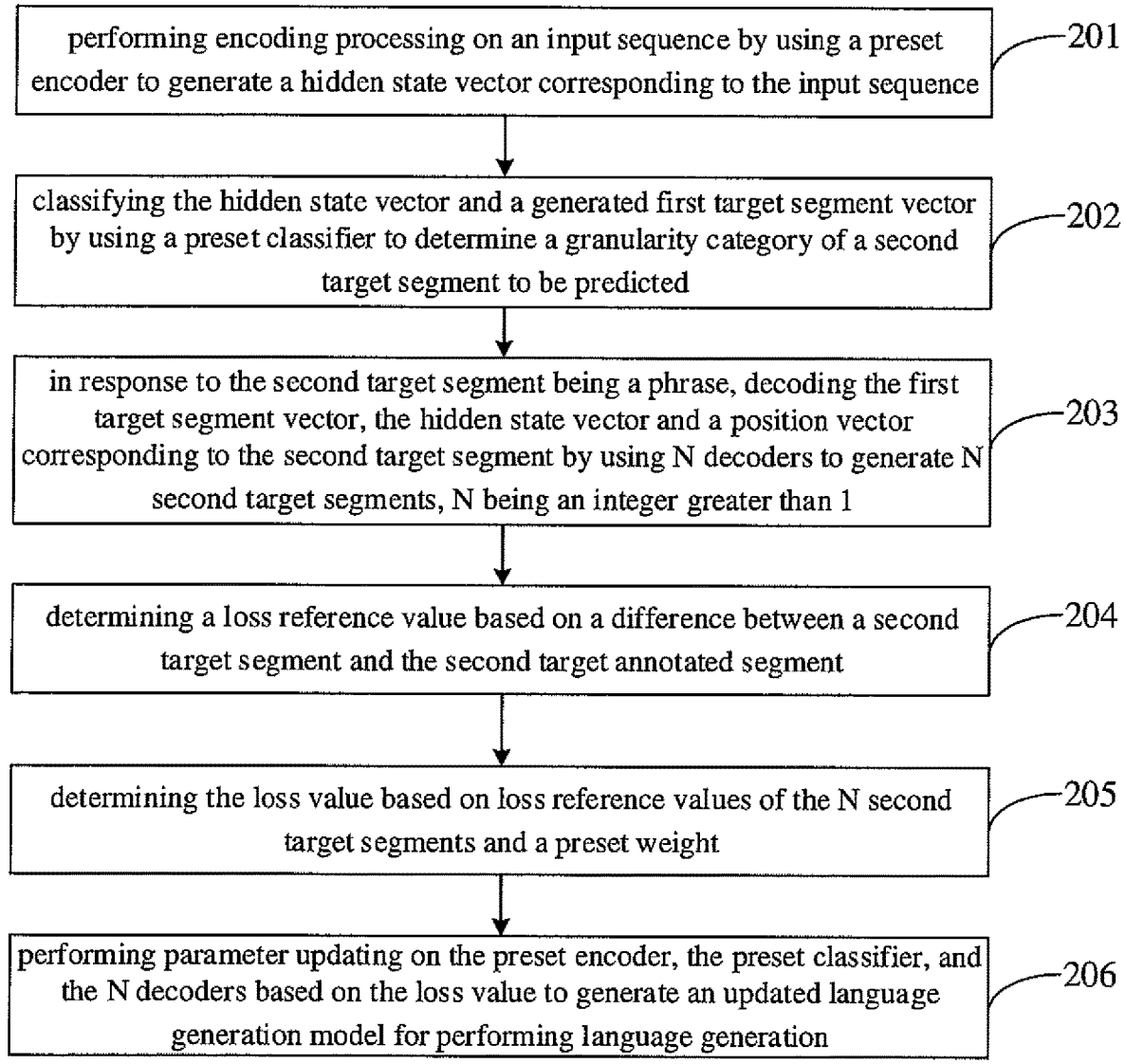
FIG. 4 is a flowchart of a language generation method according to another embodiment of the present disclosure.

FIG. 4 is a flowchart of a language generation method according to another embodiment of the present disclosure.

As illustrated in FIG. 4, the language generation method includes the followings.

At block 201, encoding processing is performed on an input sequence by using a preset encoder to generate a hidden state vector corresponding to the input sequence.

At block 202, the hidden state vector and a generated first target segment vector are classified by using a preset classifier to determine a granularity category of a second target segment to be predicted.

At block 203, in response to the second target segment being a phrase, the first target segment vector, the hidden state vector and a position vector corresponding to the second target segment are decoded by using N decoders to generate N second target segments. N is an integer greater than 1.

The specific implementation process and principles of acts in blocks 201-203 may be referred to the detailed description of the foregoing embodiments, and thus will not be repeated here.

At block 204, a loss reference value is determined based on a difference between a second target segment and the second target annotated segment.

In embodiments of the present disclosure, the vector distance between the second target segment vector and the second target annotated segment vector may be used to measure the difference between the second target segment and the second target annotated segment. Embodiments of the present disclosure are not limited in this regard.

In detail, the longer the vector distance between the second target segment vector and the second target annotated segment vector, the greater the difference between the second target segment and the second target annotated segment, and the greater the loss reference value corresponding to the second target segment; and on the contrary, the shorter the vector distance between the second target segment vector and the second target annotated segment vector, the smaller the difference between the second target segment and the second target annotated segment, and the smaller the loss reference value corresponding to the second target segment.

At block 205, the loss value is determined based on loss reference values of the N second target segments and a preset weight.

In embodiments of the present disclosure, since different decoders may play different roles in the model training process, different weights may be preset for different decoders when merging is performed on loss reference values of prediction results of respective decoders. In this manner, the loss value finally obtained not only merges the loss reference values of the prediction results of respective decoders, but also takes importance levels of different decoders in the model training process into consideration, so that the loss value finally determined is of high reliability, and the performance of the updated model is better.

As a possible implementation, after the loss reference values corresponding to respective second target segments are determined, a weighted sum of respective loss reference values may be determined based on preset weights corresponding to respective loss reference values, and then, the weighted sum of respective loss reference values is determined as the loss value.

For example, N decoders include the first decoder and the second decoder. If a preset weight corresponding to the first decoder is represented by $\lambda$, a weight corresponding to the second decoder is represented by $(1-\lambda)$, a loss reference value corresponding to the second target segment predicted by the first decoder is represented by $Loss_1$, and a loss reference value corresponding to the second target segment predicted by the second decoder is represented by $Loss_2$, the determined loss value is represented by $Loss_{total} = \lambda Loss_1 + (1-\lambda) Loss_2$.

At block 206, parameter updating is performed on the preset encoder, the preset classifier, and the N decoders based on the loss value to generate an updated language generation model for performing language generation.

The encoder, the classifier, and the decoder are elements of a language model. Updating parameters of the encoder, the classifier, and the decoder means updating parameters of the language model. Those skilled in the art may understand that these parameters are model parameters based on common knowledge in the art.

In embodiments of the present disclosure, after the loss value is determined, back propagation may be performed on the loss value. The parameter updating may be performed on the preset encoder, the preset classifier, and the N decoders based on the gradient descent optimization algorithm, so as to improve the performance of the preset encoder, the preset classifier and the N decoders until the loss value obtained by predicting the input sequence based on the updated preset encoder, preset classifier and N decoders is less than the loss value threshold. And then, it may be determined that the updated model meets requirements of performance, so that the updated preset encoder, preset classifier and N decoders may be used to generate the language generation model for performing language generation.

Further, for different language generation scenes, different supervised samples may be used to adjust parameters of the language generation model so as to generate various language generation modules suitable for different language generation scenes. That is, in a possible implementation of embodiments of the present disclosure, the act in block 206 may include the followings.

A supervised training sample is obtained based on a set language generation scene.

Parameter adjustment is performed on the updated language generation model based on the supervised training sample.

The language generation in the set language generation scene is performed by using the updated language generation model after the parameter adjustment.

The set language generation scene includes one or a combination of dialogue generation, machine translation, question-answer scene and summarization generation.

In embodiments of the present disclosure, since different language generation scenes have different performance requirements for the language generation model, different supervised training samples may be set for different language generation scenes, so as to perform fine-turning on the updated language generation model based on supervised training samples. Therefore, in embodiments of the present disclosure, after the language generation model is updated, corresponding supervised training samples may be obtained based on the current set language generation scene, and the supervised training samples may be inputted into the updated language generation model. If the prediction results of the supervised training samples obtained by the updated language generation model are quite different from annotation data of the supervised training samples, parameter adjustment may be performed on the updated language generation model until the prediction results of the supervised training samples obtained by the language generation model after the parameter adjustment meet performance requirements. The language generation model after the parameter adjustment may be used for performing language generation.

With the technical solution according to embodiments of the present disclosure, the encoding processing is performed on the input sequence by using the preset encoder to generate the hidden state vector corresponding to the input sequence. The hidden state vector and the generated first target segment vector are classified by using the preset classifier to determine the granularity category of the second target segment to be predicted. In response to the second target segment being a phrase, the first target segment vector, the hidden state vector and the position vector corresponding to the second target segment are decoded by using the N decoders to generate the N second target segments. N is an integer greater than 1. The loss reference value is determined based on the difference between the second target segment and the second target annotated segment. The loss value is determined based on the loss reference values of the N second target segments and the preset weight. The parameter updating is performed on the preset encoder, the preset classifier, and the N decoders based on the loss value to generate the updated language generation model for performing language generation. Consequently, in the pre-training process of the language generation model, language segments at different granularities are flexibly established based on original basic character units of the input sequence, and multiple encoders are used to predict the target segment at the granularity of phrase, thereby improving the learning effect on an overall semantic meaning of the input sequence, and increasing the accuracy and universality level of the language generation model.

To implement the above embodiments, the present disclosure further provides a language generation apparatus.

Figure 5:
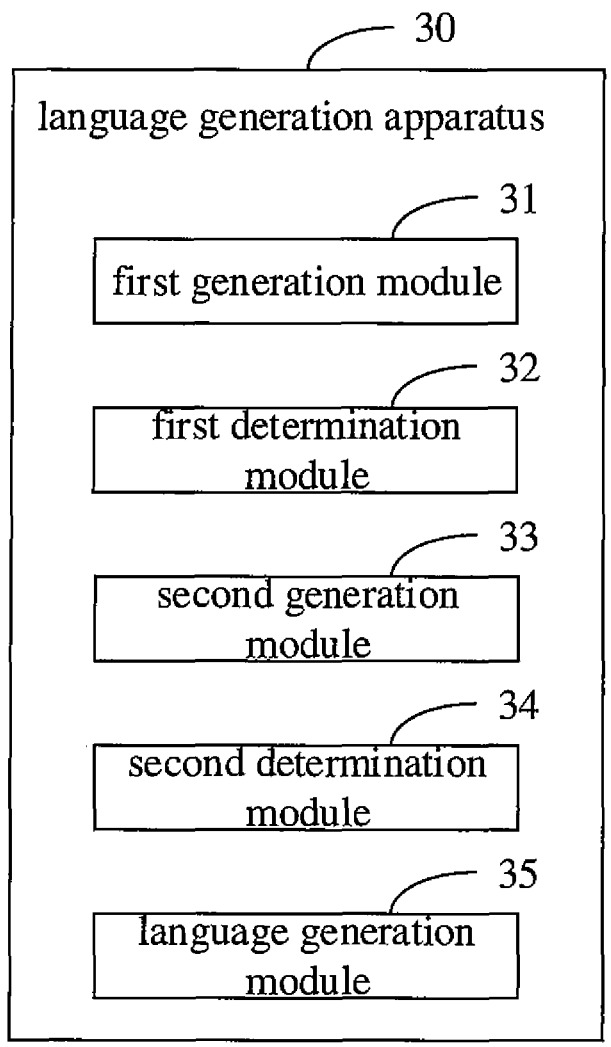
FIG. 5 is a schematic diagram of a language generation apparatus according to embodiments of the present disclosure.

FIG. 5 is a schematic diagram of a language generation apparatus according to embodiments of the present disclosure.

As illustrated in FIG. 5, a language generation apparatus 30 includes a first generation module 31, a first determination module 32, a second generation module 33, a second determination module 34, and a language generation module 35.

The first generation module 31 is configured to perform encoding processing on an input sequence by using a preset encoder to generate a hidden state vector corresponding to the input sequence.

The first determination module 32 is configured to classify the hidden state vector and a generated first target segment vector by using a preset classifier to determine a granularity category of a second target segment to be predicted.

The second generation module 33 is configured to, in response to the second target segment being a phrase, decode the first target segment vector, the hidden state vector and a position vector corresponding to the second target segment by using N decoders to generate N second target segments. N is an integer greater than 1.

The second determination module 34 is configured to determine a loss value based on differences between respective N second target segments and a second target annotated segment.

The language generation module 35 is configured to perform parameter updating on the preset encoder, the preset classifier, and the N decoders based on the loss value to generate an updated language generation model for performing language generation.

In practical applications, the language generation apparatus according to embodiments of the present disclosure may be integrated in any electronic device to implement the language generation method.

With the technical solution according to embodiments of the present disclosure, the encoding processing is performed on the input sequence by using the preset encoder to generate the hidden state vector corresponding to the input sequence. The hidden state vector and the generated first target segment vector are classified by using the preset classifier to determine the granularity category of the second target segment to be predicted. In response to the second target segment being a phrase, the first target segment vector, the hidden state vector and the position vector corresponding to the second target segment are decoded by using the N decoders to generate the N second target segments. N is an integer greater than 1. The loss value is determined based on the differences between respective N second target segments and the second target annotated segment. The parameter updating is performed on the preset encoder, the preset classifier, and the N decoders based on the loss value to generate the updated language generation model for performing language generation. Consequently, in the pre-training process of the language generation model, language segments at different granularities are flexibly established based on original basic character units of the input sequence, and multiple encoders are used to predict the target segment at the granularity of phrase, thereby improving the learning effect on an overall semantic meaning of the input sequence, and increasing the accuracy of the language generation model.

In a possible implementation of the present disclosure, the second target segment includes two characters, and the N decoders at least include a first decoder and a second decoder.

The second generation module 33 is configured to: decode the first target segment vector, the hidden state vector, and a first position vector corresponding to the second target segment by using the first decoder to generate a first candidate character at a first position; decode the first target segment vector, a vector corresponding to the first candidate character, the hidden state vector, and a second position vector corresponding to the second target segment by using the first decoder to generate a first candidate character at a second position; generate a first second target segment based on the first candidate character at the first position and the first candidate character at the second position; decode the first target segment vector, the hidden state vector and the first position vector by using the second decoder to generate a second candidate character at the first position; decode the first target segment vector, the hidden state vector and the second position vector by using the second decoder to generate a second candidate character at the second position; and generate a second second target segment based on the second candidate character at the first position and the second candidate character at the second position.

In another possible implementation of the present disclosure, the first position vector corresponding to the second target segment is a position vector of a first target segment, and the second position vector corresponding to the second target segment includes the position vector of the first target segment and a position vector of a first character in the second target segment.

It can be understood that, the second position vector corresponding to the second target segment includes the position vector of the first target segment and the position vector of the first character in the second target segment, which means that the second position vector corresponding to the second target segment can be obtained based on the position vector of the first target segment and the position vector of the first character in the second target segment.

In another possible implementation of the present disclosure, the first position vector corresponding to the second target segment is a position vector of a first character in the second target segment, and the second position vector corresponding to the second target segment is a position vector of a second character in the second target segment.

Correspondingly, the language generation apparatus 30 further includes an obtaining module. The obtaining module is configured to obtain a preset placeholder vector.

Correspondingly, the second generation module 33 is further configured to decode the preset placeholder vector, the first target segment vector, the hidden state vector, and the position vector corresponding to the second target segment by using the N decoders to generate the N second target segments.

In yet another possible implementation of the present disclosure, the language generation apparatus 30 further includes a third generation module. The third generation module is configured to, in response to the second target segment being a character, decode the first target segment vector, the hidden state vector and the position vector of the first target segment by using a decoder corresponding to the character to generate the second target segment.

In a possible implementation of the present disclosure, the second determination module 34 is configured to: determine a loss reference value based on a difference between a second target segment and the second target annotated segment; and determine the loss value based on loss reference values of the N second target segments and a preset weight.

In a possible implementation of the present disclosure, the language generation module 35 is configured to: obtain a supervised training sample based on a set language generation scene; perform parameter adjustment on the updated language generation model based on the supervised training sample; and perform the language generation in the set language generation scene by using the updated language generation model after the parameter adjustment.

In another possible implementation, the set language generation scene includes one or a combination of dialogue generation, machine translation, question-answer scene and summarization generation.

It should be noted that the foregoing explanation of embodiments of the language generation method illustrated in FIGS. 1 and 4 is also applicable to the language generation apparatus 30 according to embodiments of the present disclosure, and thus will not be repeated here.

With the technical solution according to embodiments of the present disclosure, the encoding processing is performed on the input sequence by using the preset encoder to generate the hidden state vector corresponding to the input sequence. The hidden state vector and the generated first target segment vector are classified by using the preset classifier to determine the granularity category of the second target segment to be predicted. In response to the second target segment being a phrase, the first target segment vector, the hidden state vector and the position vector corresponding to the second target segment are decoded by using the N decoders to generate the N second target segments. N is an integer greater than 1. The loss reference value is determined based on the difference between the second target segment and the second target annotated segment. The loss value is determined based on the loss reference values of the N second target segments and the preset weight. The parameter updating is performed on the preset encoder, the preset classifier, and the N decoders based on the loss value to generate the updated language generation model for performing language generation. Consequently, in the pre-training process of the language generation model, language segments at different granularities are flexibly established based on original basic character units of the input sequence, and multiple encoders are used to predict the target segment at the granularity of phrase, thereby improving the learning effect on an overall semantic meaning of the input sequence, and increasing the accuracy and universality level of the language generation model.

According to embodiments of the present disclosure, an electronic device and a readable storage medium are provided.

Figure 6:
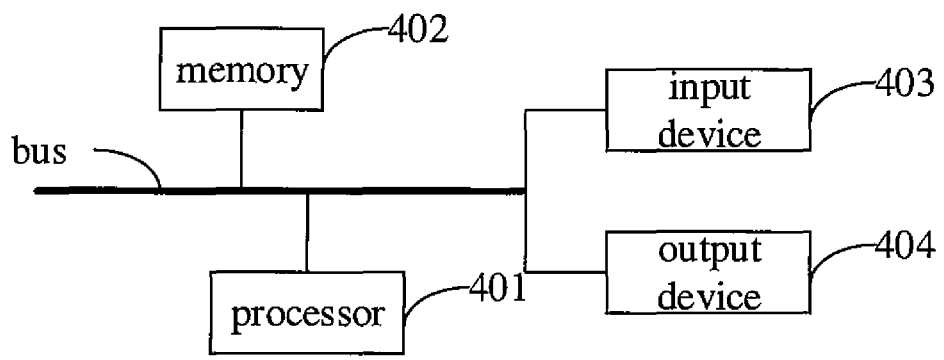
FIG. 6 is a schematic diagram of an electronic device according to embodiments of the present disclosure.

FIG. 6 is a block diagram of an electronic device for implementing a language generation method according to embodiments of the present disclosure. The electronic device is intended to represent various forms of digital computers, such as a laptop computer, a desktop computer, a workbench, a personal digital assistant, a server, a blade server, a mainframe computer and other suitable computers. The electronic device may also represent various forms of mobile devices, such as a personal digital processor, a cellular phone, a smart phone, a wearable device and other similar computing devices. Components shown herein, their connections and relationships as well as their functions are merely examples, and are not intended to limit the implementation of the present disclosure described and/or required herein.

As illustrated in FIG. 6, the electronic device includes: one or more processors 401, a memory 402, and interfaces for connecting various components, including a high-speed interface and a low-speed interface. The components are interconnected by different buses and may be mounted on a common motherboard or otherwise installed as required. The processor may process instructions executed within the electronic device, including instructions stored in or on the memory to display graphical information of the GUI on an external input/output device (such as a display device coupled to the interface). In other embodiments, when necessary, multiple processors and/or multiple buses may be used with multiple memories. Similarly, multiple electronic devices may be connected, each providing some of the necessary operations (for example, as a server array, a group of blade servers, or a multiprocessor system). One processor 401 is taken as an example in FIG. 6.

The memory 402 is a non-transitory computer-readable storage medium according to the embodiments of the present disclosure. The memory stores instructions executable by at least one processor, so that the at least one processor executes the language generation method provided by the present disclosure. The non-transitory computer-readable storage medium according to the present disclosure stores computer instructions, which are configured to make the computer execute the language generation method provided by the present disclosure.

As a non-transitory computer-readable storage medium, the memory 402 may be configured to store non-transitory software programs, non-transitory computer executable programs and modules, such as program instructions/modules (for example, the first generation module 31, the first determination module 32, the second generation module 33, the second determination module 34, and the language generation module 35 illustrated in FIG. 5) corresponding to the language generation method according to the embodiment of the present disclosure. The processor 401 executes various functional applications and performs data processing of the server by running non-transitory software programs, instructions and modules stored in the memory 402, that is, the language generation method according to the foregoing method embodiments is implemented.

The memory 402 may include a storage program area and a storage data area, where the storage program area may store an operating system and applications required for at least one function; and the storage data area may store data created according to the use of the electronic device that implements the language generation method, and the like. In addition, the memory 402 may include a high-speed random access memory, and may further include a non-transitory memory, such as at least one magnetic disk memory, a flash memory device, or other non-transitory solid-state memories. In some embodiments, the memory 402 may optionally include memories remotely disposed with respect to the processor 401, and these remote memories may be connected to the electronic device, which is configured to implement the language generation method, through a network. Examples of the network include, but are not limited to, the Internet, an intranet, a local area network, a mobile communication network, and combinations thereof.

The electronic device configured to implement the language generation method according to the embodiments of the present disclosure may further include an input device 403 and an output device 404. The processor 401, the memory 402, the input device 403 and the output device 404 may be connected through a bus or in other manners. FIG. 6 is illustrated by establishing the connection through a bus.

The input device 403 may receive input numeric or character information, and generate key signal inputs related to user settings and function control of the electronic device configured to implement the language generation method according to embodiments of the present disclosure, such as a touch screen, a keypad, a mouse, a trackpad, a touchpad, a pointing stick, one or more mouse buttons, trackballs, joysticks and other input devices. The output device 404 may include a display device, an auxiliary lighting device (for example, an LED), a haptic feedback device (for example, a vibration motor), and so on. The display device may include, but is not limited to, a liquid crystal display (LCD), a light emitting diode (LED) display and a plasma display. In some embodiments, the display device may be a touch screen.

Various implementations of systems and technologies described herein may be implemented in digital electronic circuit systems, integrated circuit systems, application-specific ASICs (application-specific integrated circuits), computer hardware, firmware, software, and/or combinations thereof. These various implementations may include: being implemented in one or more computer programs that are executable and/or interpreted on a programmable system including at least one programmable processor. The programmable processor may be a dedicated or general-purpose programmable processor that may receive data and instructions from a storage system, at least one input device and at least one output device, and transmit the data and instructions to the storage system, the at least one input device and the at least one output device.

These computing programs (also known as programs, software, software applications, or codes) include machine instructions of a programmable processor, and may implement these calculation procedures by utilizing high-level procedures and/or object-oriented programming languages, and/or assembly/machine languages. As used herein, terms "machine-readable medium" and "computer-readable medium" refer to any computer program product, device and/or apparatus configured to provide machine instructions and/or data to a programmable processor (for example, a magnetic disk, an optical disk, a memory and a programmable logic device (PLD)), and includes machine-readable media that receive machine instructions as machine-readable signals. The term "machine-readable signals" refers to any signal used to provide machine instructions and/or data to a programmable processor.

In order to provide interactions with the user, the systems and technologies described herein may be implemented on a computer having: a display device (for example, a cathode ray tube (CRT) or a liquid crystal display (LCD) monitor) for displaying information to the user; and a keyboard and a pointing device (such as a mouse or trackball) through which the user may provide input to the computer. Other kinds of devices may also be used to provide interactions with the user; for example, the feedback provided to the user may be any form of sensory feedback (e.g., visual feedback, auditory feedback or haptic feedback); and input from the user may be received in any form (including acoustic input, voice input or tactile input).

The systems and technologies described herein may be implemented in a computing system that includes back-end components (for example, as a data server), a computing system that includes middleware components (for example, an application server), or a computing system that includes front-end components (for example, a user computer with a graphical user interface or a web browser, through which the user may interact with the implementation of the systems and technologies described herein), or a computing system including any combination of the back-end components, the middleware components or the front-end components. The components of the system may be interconnected by digital data communication (e.g., a communication network) in any form or medium. Examples of the communication network include: a local area network (LAN), a wide area network (WAN), and the Internet.

Computer systems may include a client and a server. The client and server are generally remote from each other and typically interact through the communication network. A client-server relationship is generated by computer programs running on respective computers and having a client-server relationship with each other.

With the technical solution according to embodiments of the present disclosure, the encoding processing is performed on the input sequence by using the preset encoder to generate the hidden state vector corresponding to the input sequence. The hidden state vector and the generated first target segment vector are classified by using the preset classifier to determine the granularity category of the second target segment to be predicted. In response to the second target segment being a phrase, the first target segment vector, the hidden state vector and the position vector corresponding to the second target segment are decoded by using the N decoders to generate the N second target segments. N is an integer greater than 1. The loss value is determined based on the differences between respective N second target segments and the second target annotated segment. The parameter updating is performed on the preset encoder, the preset classifier, and the N decoders based on the loss value to generate the updated language generation model for performing language generation. Consequently, in the pre-training process of the language generation model, language segments at different granularities are flexibly established based on original basic character units of the input sequence, and multiple encoders are used to predict the target segment at the granularity of phrase, thereby improving the learning effect on an overall semantic meaning of the input sequence, and increasing the accuracy of the language generation model.

It should be understood that various forms of processes shown above may be reordered, added or deleted. For example, the blocks described in the present disclosure may be executed in parallel, sequentially, or in different orders. As long as the desired results of the technical solution disclosed in the present disclosure may be achieved, there is no limitation herein.

The foregoing specific implementations do not constitute a limit on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A language generation method, comprising:
   performing encoding processing on an input sequence by using a preset encoder to generate a hidden state vector corresponding to the input sequence;
   classifying the hidden state vector and a generated first target segment vector by using a preset classifier to determine a granularity category of a second target segment to be predicted;
   in response to the second target segment being a phrase, decoding the first target segment vector, the hidden state vector and a position vector corresponding to the second target segment by using N decoders to generate N second target segments, N being an integer greater than 1;
   determining a loss value based on differences between respective N second target segments and a second target annotated segment; and
   performing parameter updating on the preset encoder, the preset classifier, and the N decoders based on the loss value to generate an updated language generation model for performing language generation.

2. The method of claim 1, wherein the second target segment comprises two characters, and the N decoders at least comprise a first decoder and a second decoder; and
   decoding the first target segment vector, the hidden state vector and the position vector corresponding to the second target segment by using the N decoders to generate the N second target segments comprises:
      decoding the first target segment vector, the hidden state vector, and a first position vector corresponding to the second target segment by using the first decoder to generate a first candidate character at a first position;
      decoding the first target segment vector, a vector corresponding to the first candidate character, the hidden state vector, and a second position vector corresponding to the second target segment by using the first decoder to generate a first candidate character at a second position;
      generating a first second target segment based on the first candidate character at the first position and the first candidate character at the second position;
      decoding the first target segment vector, the hidden state vector and the first position vector by using the second decoder to generate a second candidate character at the first position;
      decoding the first target segment vector, the hidden state vector and the second position vector by using the second decoder to generate a second candidate character at the second position; and
      generating a second second target segment based on the second candidate character at the first position and the second candidate character at the second position.

3. The method of claim 2, wherein the first position vector corresponding to the second target segment is a position vector of a first target segment, and the second position vector corresponding to the second target segment comprises the position vector of the first target segment and a position vector of a first character in the second target segment.

4. The method of claim 2, wherein the first position vector corresponding to the second target segment is a position vector of a first character in the second target segment, and the second position vector corresponding to the second target segment is a position vector of a second character in the second target segment,
   before generating the N second target segments, the method further comprises:
      obtaining a preset placeholder vector; and
   generating the N second target segments comprises:
      decoding the preset placeholder vector, the first target segment vector, the hidden state vector, and the position vector corresponding to the second target segment by using the N decoders to generate the N second target segments.

5. The method of claim 1, after determining the granularity category of the second target segment to be predicted, further comprising:
   in response to the second target segment being a character, decoding the first target segment vector, the hidden state vector and the position vector of the first target segment by using a decoder corresponding to the character to generate the second target segment.

6. The method of claim 1, wherein determining the loss value based on the differences between respective N second target segments and the second target annotated segment comprises:
   determining a loss reference value based on a difference between a second target segment and the second target annotated segment; and
   determining the loss value based on loss reference values of the N second target segments and a preset weight.

7. The method of claim 6, wherein performing the language generation by using the updated language generation model is executed by:
   obtaining a supervised training sample based on a set language generation scene;

performing parameter adjustment on the updated language generation model based on the supervised training sample; and performing the language generation in the set language generation scene by using the updated language generation model after the parameter adjustment.

8. The method of claim 7, wherein the set language generation scene comprises one or a combination of dialogue generation, machine translation, question-answer scene and summarization generation.

9. A language generation apparatus, comprising a non-transitory computer-readable medium including computer-executable instructions stored thereon, and an instruction execution system which is configured by the instructions to implement at least one of:

a first generation module, configured to perform encoding processing on an input sequence by using a preset encoder to generate a hidden state vector corresponding to the input sequence;

a first determination module, configured to classify the hidden state vector and a generated first target segment vector by using a preset classifier to determine a granularity category of a second target segment to be predicted;

a second generation module, configured to, in response to the second target segment being a phrase, decode the first target segment vector, the hidden state vector and a position vector corresponding to the second target segment by using N decoders to generate N second target segments, N being an integer greater than 1;

a second determination module, configured to determine a loss value based on differences between respective N second target segments and a second target annotated segment; and a language generation module, configured to perform parameter updating on the preset encoder, the preset classifier, and the N decoders based on the loss value to generate an updated language generation model for performing language generation.

10. The apparatus of claim 9, wherein the second target segment comprises two characters, and the N decoders at least comprise a first decoder and a second decoder; and the second generation module is configured to:

decode the first target segment vector, the hidden state vector, and a first position vector corresponding to the second target segment by using the first decoder to generate a first candidate character at a first position;

decode the first target segment vector, a vector corresponding to the first candidate character, the hidden state vector, and a second position vector corresponding to the second target segment by using the first decoder to generate a first candidate character at a second position;

generate a first second target segment based on the first candidate character at the first position and the first candidate character at the second position;

decode the first target segment vector, the hidden state vector and the first position vector by using the second decoder to generate a second candidate character at the first position;

decode the first target segment vector, the hidden state vector and the second position vector by using the second decoder to generate a second candidate character at the second position; and generate a second second target segment based on the second candidate character at the first position and the second candidate character at the second position.

11. The apparatus of claim 10, wherein the first position vector corresponding to the second target segment is a position vector of a first target segment, and the second position vector corresponding to the second target segment comprises the position vector of the first target segment and a position vector of a first character in the second target segment.

12. The apparatus of claim 10, wherein the first position vector corresponding to the second target segment is a position vector of a first character in the second target segment, and the second position vector corresponding to the second target segment is a position vector of a second character in the second target segment, the instruction execution system is further configured by the instructions to implement:
an obtaining module, configured to obtain a preset placeholder vector; and
the second generation module is further configured to:
decode the preset placeholder vector, the first target segment vector, the hidden state vector, and the position vector corresponding to the second target segment by using the N decoders to generate the N second target segments.

13. The apparatus of claim 9, wherein the instruction execution system is further configured by the instructions to implement:

a third generation module, configured to, in response to the second target segment being a character, decode the first target segment vector, the hidden state vector and the position vector of the first target segment by using a decoder corresponding to the character to generate the second target segment.

14. The apparatus of claim 9, wherein the second determination module is configured to:

determine a loss reference value based on a difference between a second target segment and the second target annotated segment; and determine the loss value based on loss reference values of the N second target segments and a preset weight.

15. The apparatus of claim 14, wherein the language generation module is configured to:

obtain a supervised training sample based on a set language generation scene;

perform parameter adjustment on the updated language generation model based on the supervised training sample; and perform the language generation in the set language generation scene by using the updated language generation model after the parameter adjustment.

16. The apparatus of claim 15, wherein the set language generation scene comprises one or a combination of dialogue generation, machine translation, question-answer scene and summarization generation.

17. An electronic device, comprising:
at least one processor; and
a storage device communicatively connected to the at least one processor; wherein,
the storage device stores an instruction executable by the at least one processor, and when the instruction is executed by the at least one processor, the at least one processor may implement the method of claim 1.

18. A non-transitory computer-readable storage medium having a computer instruction stored thereon, wherein the computer instruction is configured to make a computer implement a language generation method, and the method comprises:

performing encoding processing on an input sequence by using a preset encoder to generate a hidden state vector corresponding to the input sequence;

classifying the hidden state vector and a generated first target segment vector by using a preset classifier to determine a granularity category of a second target segment to be predicted;

in response to the second target segment being a phrase, decoding the first target segment vector, the hidden state vector and a position vector corresponding to the second target segment by using N decoders to generate N second target segments, N being an integer greater than 1;

determining a loss value based on differences between respective N second target segments and a second target annotated segment; and performing parameter updating on the preset encoder, the preset classifier, and the N decoders based on the loss value to generate an updated language generation model for performing language generation.

\* \* \* \* \*